(12) United States Patent
Choi

(10) Patent No.: US 9,067,635 B2
(45) Date of Patent: Jun. 30, 2015

(54) FRAME UNIT FOR BICYCLE AND METHOD OF MANUFACTURING THE SAME

(71) Applicant: Hyundai Motor Company, Seoul (KR)

(72) Inventor: Jungnam Choi, Seongnam-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/106,595

(22) Filed: Dec. 13, 2013

(65) Prior Publication Data

US 2015/0048587 A1    Feb. 19, 2015

(30) Foreign Application Priority Data

Aug. 16, 2013 (KR) .......................... 10-2013-0097431

(51) Int. Cl.
    *B62K 19/08*    (2006.01)
(52) U.S. Cl.
    CPC ........................................ *B62K 19/08* (2013.01)
(58) Field of Classification Search
    USPC ...................................................... 280/281.1
    See application file for complete search history.

(56) References Cited

U.S. PATENT DOCUMENTS

| | | | | |
|---|---|---|---|---|
| 2,089,889 A | * | 8/1937 | Giordani | 280/288.3 |
| 2,378,961 A | * | 6/1945 | Wallace et al. | 280/288.3 |
| 4,613,146 A | * | 9/1986 | Sharp et al. | 280/288.2 |
| 5,011,172 A | * | 4/1991 | Bellanca et al. | 280/281.1 |
| 5,464,240 A | * | 11/1995 | Robinson et al. | 280/281.1 |
| 5,769,442 A | * | 6/1998 | Robinson et al. | 280/281.1 |
| 5,791,673 A | * | 8/1998 | Patterson | 280/281.1 |
| 5,913,529 A | * | 6/1999 | Patterson | 280/281.1 |
| 6,109,638 A | * | 8/2000 | Colegrove | 280/288.3 |
| 7,971,892 B2 | * | 7/2011 | Sasnowski et al. | 280/288.3 |

FOREIGN PATENT DOCUMENTS

| | | |
|---|---|---|
| JP | 58-6742 A | 1/1983 |
| JP | 3004828 U | 11/1994 |
| JP | 2001-334981 A | 12/2001 |
| KR | 10-1116641 B1 | 3/2011 |
| KR | 10-2011-0037715 A | 4/2011 |
| KR | 10-2012-0111687 A | 10/2012 |

* cited by examiner

*Primary Examiner* — Kevin Hurley
(74) *Attorney, Agent, or Firm* — Morgan, Lewis & Bockius LLP

(57) ABSTRACT

A frame unit for a bicycle may include a left frame body in which a part of a seat tube, a part of a frame, and a left stay are integrally formed, and a right frame body in which a part of the seat tube, a part of the frame, and a right stay are integrally formed, and wherein the left frame body and the right frame body are joined to each other along edges of the left and right frame bodies so as to integrally form the head tube, the seat tube, and the frame.

8 Claims, 6 Drawing Sheets

FRAME UNIT FOR BICYCLE AND METHOD OF MANUFACTURING THE SAME

CROSS-REFERENCE TO RELATED APPLICATION

The present application claims priority of Korean Patent Application Number 10-2013-0097431 filed Aug. 16, 2013, the entire contents of which application is incorporated herein for all purposes by this reference.

BACKGROUND OF INVENTION

1. Field of Invention

The present invention relates to a frame unit for a bicycle and a method of manufacturing the same, and more particularly, to a frame unit for a bicycle which includes a head tube, a seat tube, a frame, and left and right stays and a method of manufacturing the same.

2. Description of Related Art

In general, a frame unit for a bicycle is a constituent component that forms an overall structure of a bicycle, and manufactured by mutually joining constituent components such as a head tube, a seat tube, a frame, and left and right stays.

Regarding the frame unit for a bicycle, allowing flexibility to provide various designs and secure rigidity for safety are core factors, and to this end, the respective manufacturers actively conduct researches on development of technologies, process methods, materials, and the like.

Recently, in order to implement various designs and secure rigidity for safety, materials such as aluminum, chromium-molybdenum steel, carbon, and titanium are used instead of a high tensile steel material that is generally used.

FIG. 1 is a configuration diagram of a frame unit for a bicycle according to the related art.

Referring to FIG. 1, a frame unit 100 for a bicycle of the related art includes a head tube 101, a seat tube 103, an upper frame 105, a lower frame 107, and upper and lower stays 109 and 111 disposed at both sides.

A steering shaft (not illustrated) to which a steering handle is connected is installed on the head tube 101, and a seat pipe (not illustrated) connected to a seat is installed on the seat tube 103.

The upper and lower frames 105 and 107 connect and support the head tube 101 and the seat tube 103.

Rear ends of both the upper and lower stays 109 and 111 are connected to each other so as to form a rotating body fork 113 to which a rear wheel is mounted.

A front end of the lower stay 111 is connected to a pedal assembly 115 that is configured at a lower end of the seat tube 103.

Meanwhile, the frame unit 100 for a bicycle mostly includes both the upper frame 105 and the lower frame 107, but in some cases, only a single frame, that is, only the upper frame 105 may be applied between the head tube 101 and the seat tube 103.

However, according to the frame unit 100 for a bicycle of the related art, which has the aforementioned configuration, when the head tube 101, the seat tube 103, the upper frame 105, the lower frame 107, and the upper and lower stays 109 and 111 are joined to each other by a welding process, residual stress due to welding heat is distributed to joining portions. Particularly, impact loads are directly applied when the bicycle runs, thereby causing a serious problem with respect to safety such as cracks or damage occurring at the periphery of the joining portions.

Since the process of welding the joining portions is manually performed, an inferiority rate is high because there is a difference in welding quality in accordance with skill of workers and working environment, and thereby, there are drawbacks in that an excessive working time is required and productivity deteriorates.

In addition, when the head tube 101 and the upper and lower frames 105 and 107 are joined to each other by a welding process, weld beads protrude at the joining portions between the respective components, thereby causing deterioration in overall aesthetic appearance because of heterogeneity between the respective components.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a frame unit for a bicycle and a method of manufacturing the same having advantages of improving rigidity and design quality.

Various aspects of the present invention provide for a frame unit for a bicycle that may include a left frame body in which a part of a seat tube, a part of a frame, and a left stay are integrally formed, and a right frame body in which a part of the seat tube, a part of the frame, and a right stay are integrally formed, and wherein the left frame body and the right frame body are joined to each other along edges of the left and right frame bodies so as to integrally form the head tube, the seat tube, and the frame.

Support rings may be mounted to upper and lower ends of the head tube.

A plurality of reinforcing beads may be formed at the joining portion of the frame and the head tube.

A reinforcing line, bent to outward, may be formed at the joining portion of the frame and the head tube.

The left frame body and the right frame body may be coupled by a welding method.

Various aspects of the present invention provide for a method of manufacturing a frame unit for a bicycle that may include press-forming a left frame body in which a part of a head tube where a steering shaft is mounted thereto, a part of a seat tube where a seat pipe is mounted thereto, a part of a frame configured to integrally connect the head tube and the seat tube and form a body of a bicycle, and a left stay are integrally formed, press-forming a right frame body in which a part of the head tube, a part of the seat tube, and a right stay are integrally formed, and coupling the left frame body and the right frame body each other along edges of the left and right frame bodies.

Support rings may be mounted to upper and lower ends of the head tube.

A plurality of reinforcing beads may be formed at the joining portion of the frame and the head tube in the press-formings of the left and right frame bodies.

A reinforcing line, bent to outward, may be formed at the joining portion of the frame and the head tube.

The left frame body and the right frame body may be coupled by a welding method.

According to various embodiments of the present invention, a head tube, a seat tube, a frame, a pedal assembly and a left and right stays are integrally formed with the main frame without a joining portion such that residual stress due to welding heat at a joining portion in the related art may be removed, and a factor, which causes joint rigidity deterioration due to the residual stress, may be eliminated.

Accordingly, rigidity and durability between the head tube and the frame with respect to an impact load transmitted from a road surface and a fatigue load of the frame unit per se are firmly maintained, thereby preventing damage such as cracks, and securing safety.

The left and right frame bodies, which form the frame unit for a bicycle, are integrally formed, thereby making the entire exterior appearance of the frame unit for a bicycle be aesthetically attractive.

In addition, welding work is performed along edges of the left and right frame bodies when the left and right frame bodies are joined, such that welding processes may be automated, working times may be reduced due to the automation, and welding quality and productivity may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
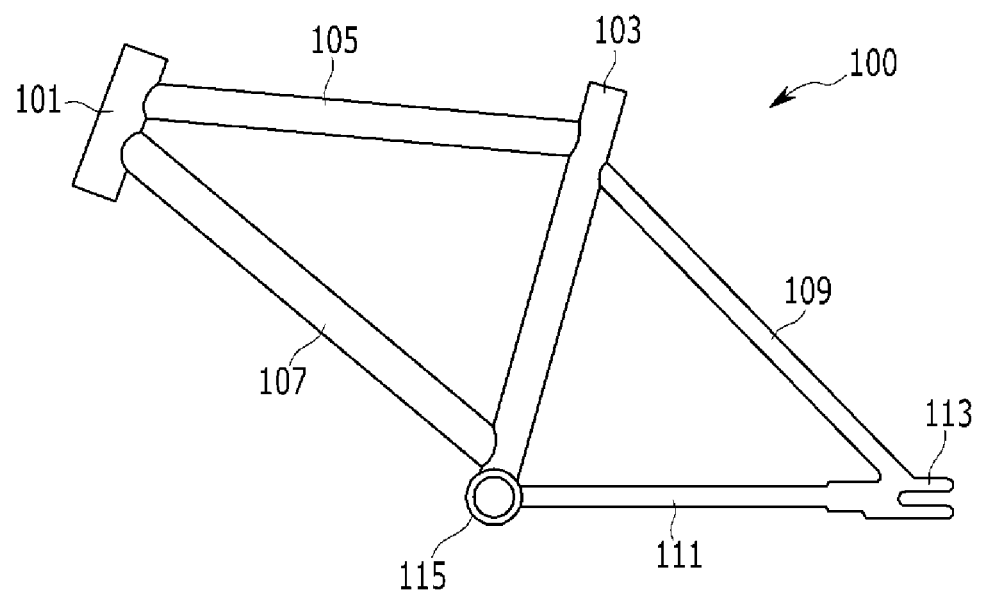
FIG. 1 is a configuration diagram of a frame unit for a bicycle according to the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present invention, and the same or similar elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

Throughout the specification and the claims, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

Figure 2:
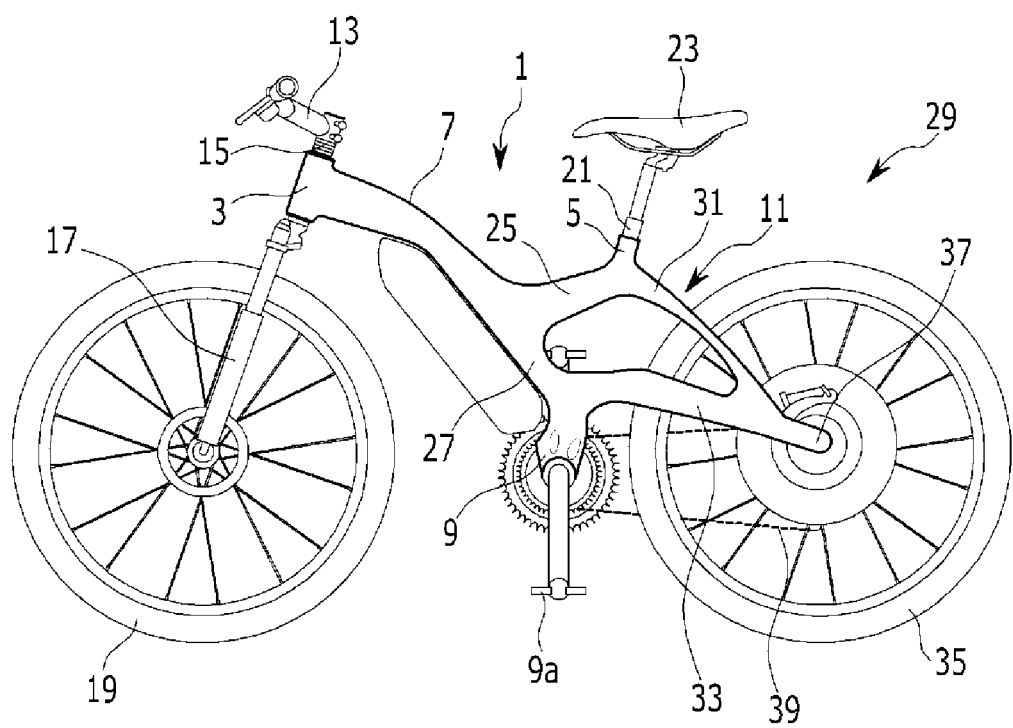
FIG. 2 is a side view of an exemplary frame unit for a bicycle according to the present invention.
Figure 3:
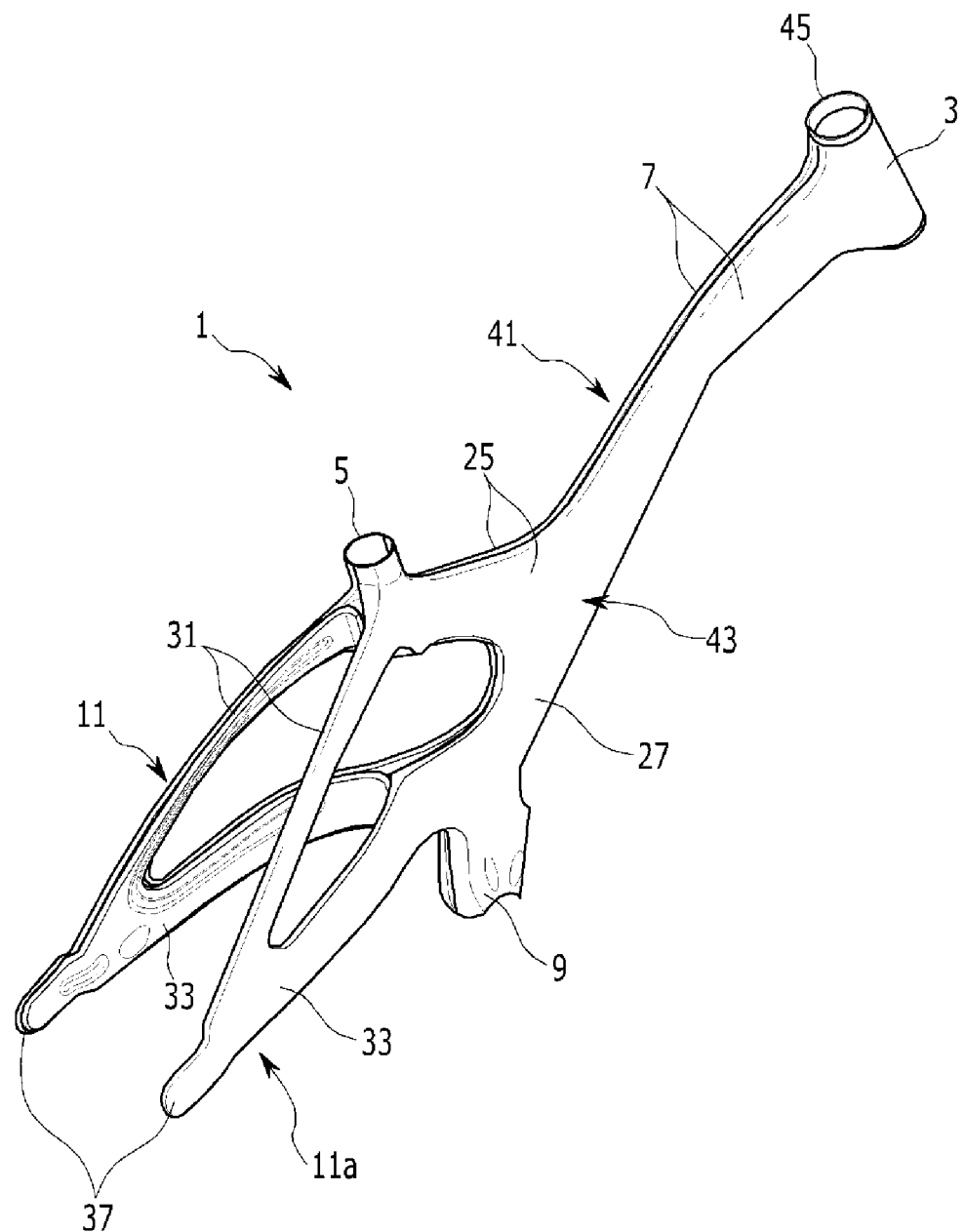
FIG. 3 is a perspective view of an exemplary frame unit for a bicycle according to the present invention.
Figure 4:
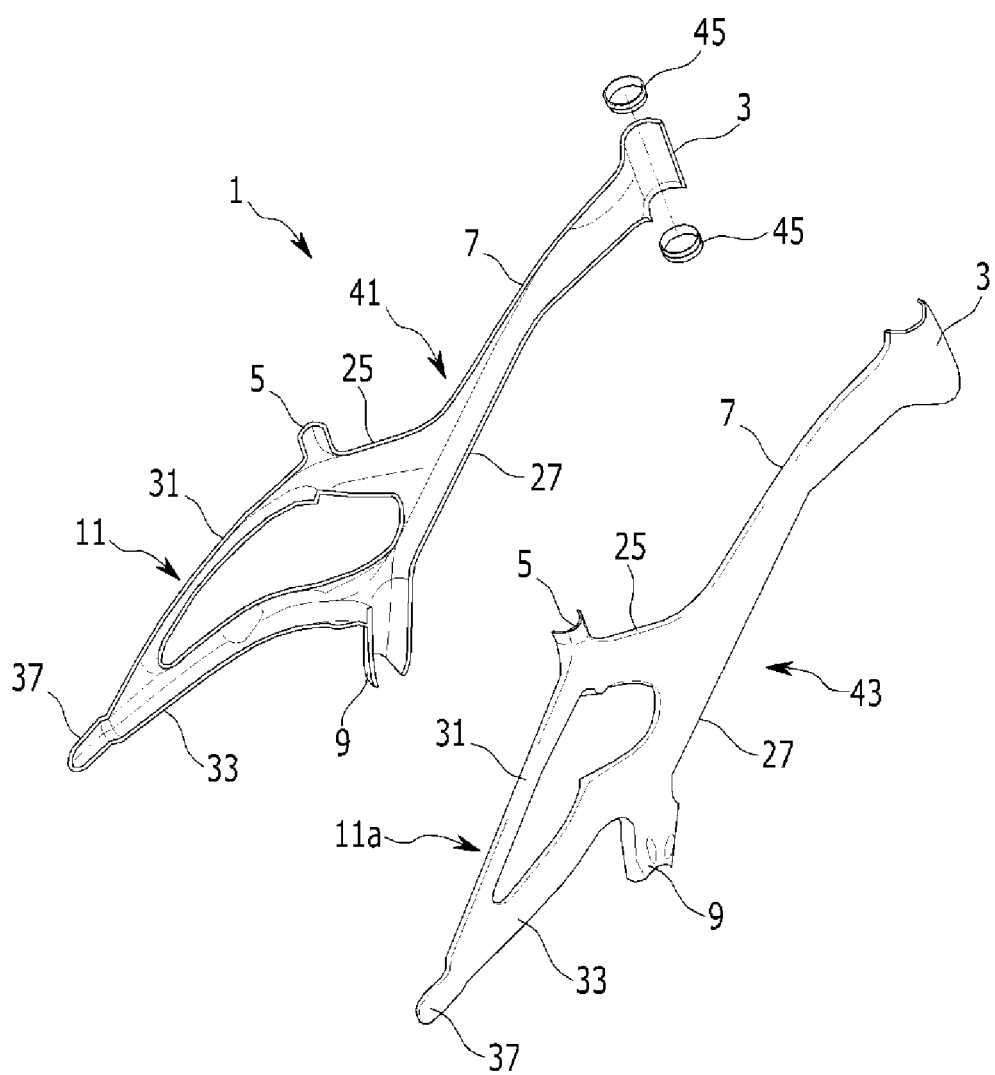
FIG. 4 is an exploded perspective view of an exemplary frame unit for a bicycle according to the present invention.

FIG. 2 is a side view of a frame unit for a bicycle according to various embodiments of the present invention, FIG. 3 is a perspective view of a frame unit for a bicycle according to various embodiments of the present invention, and FIG. 4 is an exploded perspective view of a frame unit for a bicycle according to various embodiments of the present invention.

Referring to FIGS. 2 to 4, a frame unit 1 for a bicycle according to various embodiments of the present invention includes a head tube 3, a seat tube 5, a frame 7, a pedal assembly 9, and left and right stays 11 and 11a.

A steering shaft 15 to which a handle 13 is mounted is installed to the head tube 3, and a front wheel 19 is installed by a fork 17 configured at a lower side of the steering shaft 15.

A seat 23 is installed to the seat tube 5 by a seat pipe 21.

The frame 7 may include an upper extension frame 25 configured to integrally connect the head tube 3 and the seat tube 5, and a lower extension frame 27 integrally connected to the pedal assembly 9, and forms a body of a bicycle 29. One will appreciate that such integral components may be monolithically formed.

The left and right stays 11 and 11a include an upper stay 31, and a lower stay 33, respectively, and rear ends of both the upper stays 31 and rear ends of both the lower stays 33 are connected to each other so as to form a rotating body fork 37 to which a rear wheel 35 is mounted.

Further, front ends of both the upper stays 31 are connected to the seat tube 5, and front ends of both the lower stays 33 are connected to the pedal assembly 9 configured at a lower side of the seat tube 5.

The pedal assembly 9 may be formed to protrude downward at a lower side between the frame 7 and both the lower stays 33, and a pedal 9a, which is connected to the rear wheel 35 by a chain 39, is installed on the pedal assembly 9.

Here, the head tube 3, the seat tube 5, the frame 7, the pedal assembly 9, and the left and right stays 11 and 11a are formed by a left frame body 41 and a right frame body 43, which are integrally formed. One will appreciate that such integral components may be monolithically formed.

Further, the left and right frame bodies 41 and 43 are joined along edges thereof so as to form an overall configuration of the frame unit 1 for a bicycle.

The left and right frame bodies 41 and 43 are joined to each other by a welding method, and in this case, the welding method may be an arc welding method or the like.

The head tube 3 is assembled with support ring 45 configured upper and lower ends thereof.

An interior diameter of the support ring 45 corresponds to an exterior diameter of the steering shaft 15. Thus, the support rings 45 with various interior diameters may be equipped to the head tube 3 for corresponding to the exterior diameter of the steering shaft 15.

Thus, replacement of the support ring 45 may allow design change of the steering shaft 15 without hard work.

Figure 5:
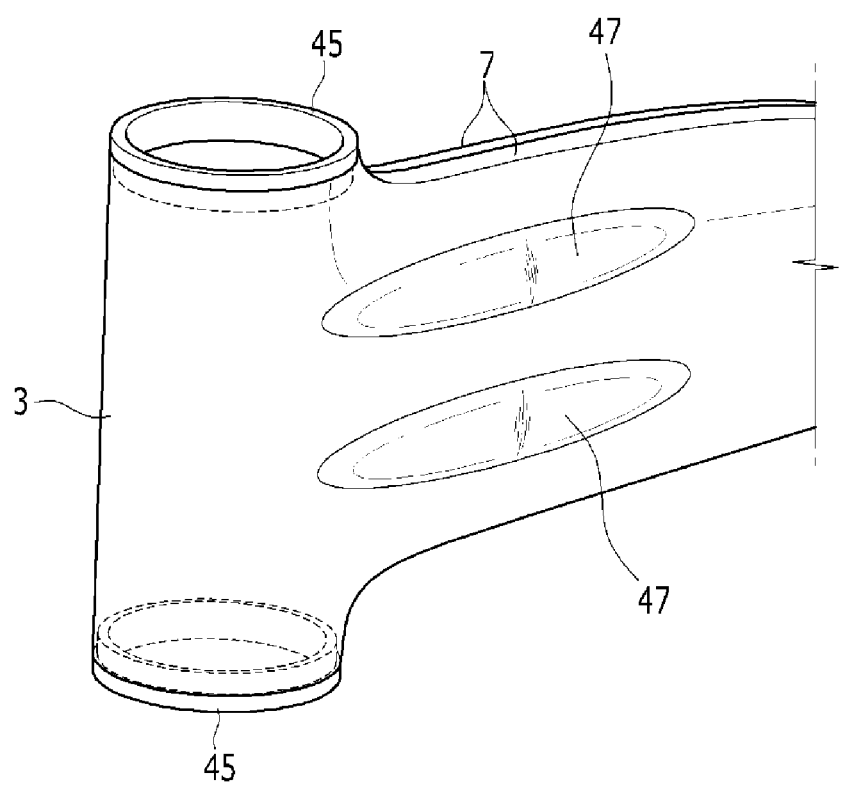
FIG. 5 is an enlarged perspective view illustrating a state in which reinforcing beads are formed on a frame portion adjacent to a head tube of the exemplary frame unit for a bicycle according to the present invention.

FIG. 5 is an enlarged perspective view illustrating a state in which reinforcing beads are formed on a frame portion adjacent to a head tube of the frame unit for a bicycle according to various embodiments of the present invention.

Referring to FIG. 5, reinforcing beads 47 are formed to protrude at the joining portion of the frame 7 and the head tube 3.

The reinforcing beads 47 protrude so as to intersect inward and outward along an up and down direction of the joining portion of the head tube 3 and the frame 7, thereby improving rigidity of the joining portion of the head tube 3 and the frame 7 per se.

In the drawing, the reinforcing bead 47 are protruded outward, however it is not limited thereto. The reinforcing bead 47 may protrude inward and/or outward.

The plurality of the reinforcing bead 47 may be repeatedly formed, and repeated shapes of the reinforcing bead 74 may improve an overall design of the frame unit 1 for a bicycle as well as improve rigidity of the frame 7.

Figure 6:
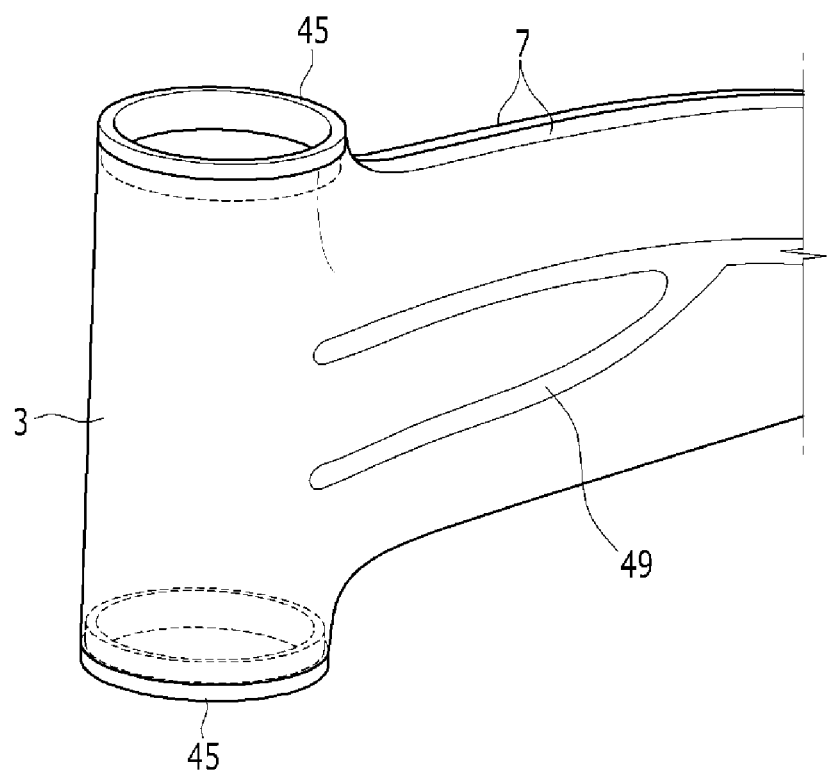
FIG. 6 is an enlarged perspective view illustrating a state in which a reinforcing line is formed on a frame portion adjacent to a head tube of the exemplary frame unit for a bicycle according to the present invention.

FIG. 6 is an enlarged perspective view illustrating a state in which a reinforcing line is formed on a frame portion adjacent to a head tube of the frame unit for a bicycle according to various embodiments of the present invention.

Referring to FIG. 6, a reinforcing line 49 is formed at the joining portion of the frame 7 and the head tube 3.

The reinforcing line 49 may be formed to be bent.

The reinforcing line 49 may improve the rigidity of the frame 7 as well as an overall design of the frame unit 1 by forming various shapes.

The reinforcing line 49 may protrude from the frame 7, however it is not limited thereto. The reinforcing line 49 may be formed with various shapes, thus may improve design of the frame unit 1.

According to the frame unit 1 for a bicycle according to various embodiments of the present invention, which has the aforementioned configuration, the head tube 3 is integrally formed with the main frame 7 without a joining portion such that residual stress due to welding heat at a joining portion in the related art may be removed, and a factor, which causes joint rigidity deterioration due to the residual stress, may be eliminated. One will appreciate that such integral components may be monolithically formed.

In addition, an occurrence of a safety accident due to cracks and damage which have occurred at the joining portion is reduced, and rigidity and durability between the head tube 3 and the frame 7 with respect to an impact load transmitted from a road surface and a fatigue load of the frame unit per se are firmly maintained.

Further, the left and right frame bodies 41 and 43, which form the frame unit 1 for a bicycle, are integrally formed, thereby making the entire exterior appearance of the frame unit 1 for a bicycle be aesthetically attractive.

In addition, welding beads, which occur when the left and right frame bodies 41 and 45 are joined, are not directly exposed to a surface, such that an influence on the entire exterior appearance design of the frame unit 1 for a bicycle is minimized.

In addition, welding work is performed along edges of the left and right frame bodies 41 and 43 when the left and right frame bodies 41 and 43 are joined, such that welding processes may be automated, working times may be reduced due to the automation, and welding quality and productivity may be improved.

Hereinafter, a method of manufacturing the frame unit 1 for a bicycle according to various embodiments of the present invention, which has been described above, will be described with reference to FIGS. 3 to 4.

First, the seat tube 5, the frame 7, the pedal assembly 9, and the left and right stays 11 and 11a are integrally formed, and the left and right frame bodies 41 and 43, which are symmetric to each other, are press-formed, respectively as shown in FIG. 4.

When the left and right frame bodies 41 and 43 are press-formed, the plurality of reinforcing beads 47, which protrudes inward and outward as illustrated in FIG. 5, may also be formed on the joining portion of the head tube 3 and the frame 7, and on the pedal assembly 9 along length direction of the frame 7.

Or, the reinforcing line 49, bent to outward may be formed on the joining portion of the head tube 3 and the frame 7, and on the pedal assembly 9 along length direction of the frame 7.

Thereafter, the left and right frame bodies 41 and 43 formed by a press are joined to each other by welding along edges of the left and right frame bodies 41 and 43, and manufactured as the frame unit 1 for a bicycle, as illustrated in FIG. 3.

In this case, when welding the left and right frame bodies 41 and 43, or before welding the left and right frame bodies 41 and 43, the support rings 45 are connected to the upper and the lower inside portion of the head tube 3 for mounting the steering shaft 15.

The support rings 45 may be connected to the head tube 3 when the left and right frame bodies are joined in a state in which the support rings 45 are fitted or temporarily joined to the left and right frame bodies. Or the support rings 45 may be connected to the head tube 3 after the left and right frame bodies 41 and 43 are joined.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A frame unit for a bicycle comprising:
   a left frame body including a part of a seat tube, a part of a frame, and a left stay integrally formed together; and
   a right frame body including a part of the seat tube, a part of the frame, and a right stay integrally formed together;
   wherein the left frame body and the right frame body are joined to each other along edges of the left and right frame bodies to integrally form the head tube, the seat tube, and the frame,
   wherein a first end of a first support ring is mounted inside an upper end of the head tube, and a second end of the first support ring is mounted outside the upper end of the head tube, and a first end of a second support ring is mounted inside a lower end of the head tube, and a second end of the second support ring is mounted outside the lower end of the head tube.

2. The frame unit of claim 1, wherein a plurality of reinforcing beads are formed at the joining portion of the frame and the head tube.

3. The frame unit of claim 1, wherein a reinforcing line, bent to outward, is formed at the joining portion of the frame and the head tube.

4. The frame unit of claim 1, wherein the left frame body and the right frame body are welded together.

5. A method of manufacturing a frame unit for a bicycle comprising:
- press-forming a left frame body including a part of a head tube configured to support a steering shaft, a part of a seat tube configured to mount a seat pipe, a part of a frame configured to integrally connect the head tube and the seat tube and form a body of a bicycle, and a left stay are integrally formed;
- press-forming a right frame body in which a part of the head tube, a part of the seat tube, and a right stay are integrally formed; and
- coupling the left frame body and the right frame body each other along edges of the left and right frame bodies, wherein a first end of a first support ring is mounted inside an upper end of the head tube, and a second end of the first support ring is mounted outside the upper end of the head tube, and a first end of a second support ring is mounted inside a lower end of the head tube, and a second end of the second support ring is mounted outside the lower end of the head tube.

6. The method of claim 5, wherein a plurality of reinforcing beads are formed at the joining portion of the frame and the head tube in the press-formings of the left and right frame bodies.

7. The method of claim 5, wherein a reinforcing line, bent outward, is formed at the joining portion of the frame and the head tube.

8. The method of claim 5, wherein the left frame body and the right frame body are welded together.

* * * * *